United States Patent Office 3,359,329
Patented Dec. 19, 1967

3,359,329
HALOALKYL PROPYNYL ETHERS
Charles T. Pumpelly, Midland, Joseph J. Pedjac, Mount Pleasant, and Eric R. Larsen, Midland, Mich., assignors to The Dow Chemical Company, Midland, Mich., a corporation of Delaware
No Drawing. Filed Mar. 18, 1963, Ser. No. 266,038
10 Claims. (Cl. 260—614)

This invention relates to new compositions of matter useful for inhibiting the reaction of aluminum with haloalkanes and to methods for the preparation of such compositions. More particularly, the present invention relates to haloalkyl propynyl ethers which contain at least two fluorine atoms in the molecule, to a method for manufacturing such compounds and to inhibited haloalkane compositions containing such haloalkyl propynyl ethers.

Propynyl ethers which contain fluorine atoms are known in the literature. For example, the compound 2,2,2-trifluoroethyl propynyl ether is disclosed in U.S. Patent No. 3,030,311 to Oakes. Numerous acetylenic ethers are disclosed by Foster et al. in Ind. and Eng. Chem., vol. 51, No. 7, pp. 825–828. Still other classes of acetylenic ethers are disclosed by Arens in U.S. Patent No. 2,813,862 and by Monroe et al. in U.S. Patent No. 2,946,825.

It is an object of the present invention to provide both a new class of polyhaloalkyl propynyl ethers and a process for preparing these ethers. A further object of the invention is to provide a process for substantially inhibiting the reaction of haloalkane solvents with aluminum or aluminum-containing alloys. A still further object is to furnish novel compositions which contain a haloalkane solvent and a polyhaloalkyl propynyl ether. A special object of the invention is to provide a process and composition for preventing the decomposition of haloalkanes by reaction of said haloalkanes with aluminum.

The compounds of this invention may be represented by the formula (I)
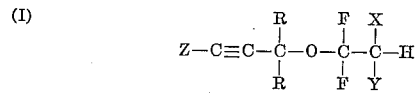

wherein each R is independently selected from the group consisting of hydrogen, a monovalent saturated hydrocarbon group of from 1 to 6 carbon atoms (preferably an alkyl group of from 1 to 6 carbon atoms or a cycloalkyl group of from 3 to 6 carbon atoms); X and Y are both fluorine only when Z is Cl, Br or I, and X and Y are each selected from the group consisting of the halogens (F, Cl, Br, I), an alkyl group of from 1 to 6 carbon atoms and a perfluoroalkyl group of from 1 to 6 carbon atoms; and wherein Z represents a hydrogen atom or a lower halogen atom (Cl, Br, I) and preferably a middle halogen (Cl and Br). The terms "lower halogen" and "middle halogen" refer to the relative positions of the halogens in Group VII–A of the Periodic Table (Lange's Handbook of Chemistry, 5th edition, pp. 54–55, 1944), the "lower halogens" having higher atomic numbers. When X and Y are both halogens, the middle halogens (Cl and Br) are also preferred substituents. When R is an alkyl group, the lower alkyl groups of from 1 to 4 carbon atoms (such as methyl, ethyl, n-propyl, i-propyl, n-butyl, i-butyl, sec.-butyl and tert.-butyl) are preferred. Typical examples of compounds within the scope of the present invention include 2-chloro-2-bromo-1,1-difluoroethyl 1,1-dimethylpropynyl ether, 2,2-dibromo-1,1-difluoroethyl 1-cyclohexylpropynyl ether, 2,2-diiodo-1,1-difluoroethyl 1-i-butylpropynyl ether, 2-chloro-2-iodo-1,1-difluoroethyl 1-methyl-1-ethylpropynyl ether, 2-iodo-2-chloro-1,1-difluoroethyl 1-n-propyl propynyl ether, 2-chloro-1,1-difluorohexyl propynyl ether, 3,3-dichloro-1,1-difluoropropyl propynyl ether, 1,1,2,3,3,3-hexafluoropropyl propynyl ether, 2-iodo-1,1-difluorohexyl propynyl ether, 2-chloro-1,1,2-trifluoroethyl 3-chloropropynyl ether, 2-trifluoromethyl-1,1,3,3,3 - pentafluoropropyl propynyl ether, 2-chloro-1,1,2-trifluoroethyl 3-bromopropynyl ether, 2-hydroperfluorooctyl propynyl ether and 2,2-dibromo-1,1-difluoroethyl 1,1-diethylpropynyl ether.

The compounds of the invention may be prepared by reacting an acetylenic alcohol containing at least three carbon atoms with a halogenated unsaturate containing two fluorine atoms attached to the same olefinic carbon atom to form the corresponding haloalkyl propynyl ether. Preferably, in addition to the two fluorine atoms attached to the same olefinic carbon atoms, the halogenated unsaturate also contains at least one dissimilar halogen atom. These novel haloalkyl propynyl ethers may then be reacted further with a halogen (usually in the presence of a base) to replace the remaining acetylenic hydrogen atom with a halogen atom.

The reaction sequence used in the process for preparing the compounds of the invention may be represented by the following equations:

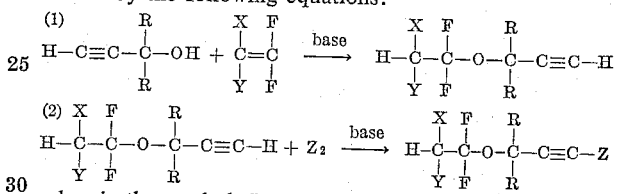

wherein the symbols R, X, Y and Z are as defined in Formula I. The novel compounds produced by both reactions (1) and (2) are all useful to either delay or prevent the decomposition of aluminum by haloalkyls.

Typical preparative reactions include the following:

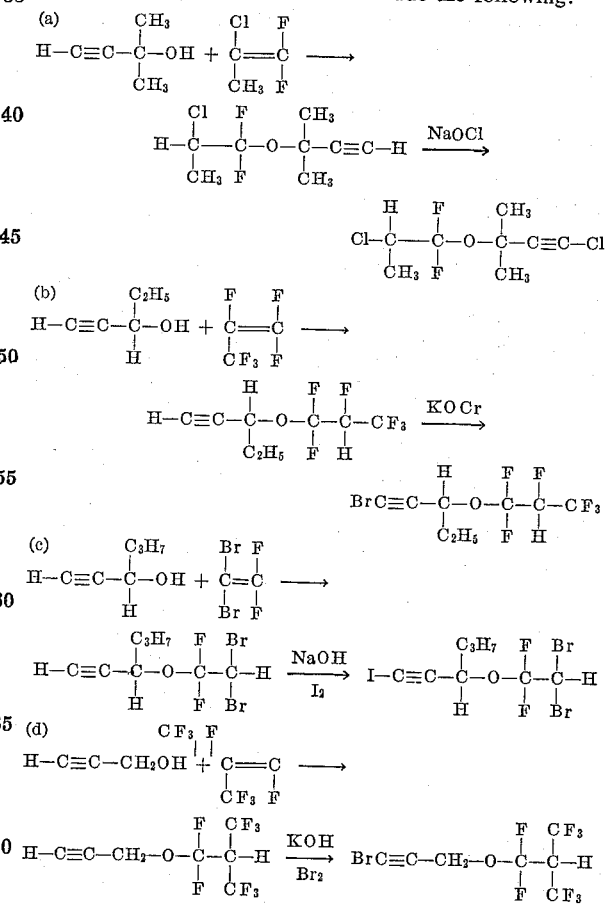

The base-catalyzed addition of propargyl alcohol (or a lower alkyl-substituted propargyl alcohol) to the appropriate haloolefin is most conveniently carried out in the presence of a strong base such as NaOH, KOH, $K_2CO_3$, and $Na_2CO_3$. A strong base anion exchange resin such as a resin employing a quaternary ammonium type of structure (for example) a polymeric trimethyl benzyl ammonium structure) may also be used when there is no branching of the propynyl alcohol at the 1 position. In either case, the reaction is generally carried out at temperatures of from about 5° C. to about 35° C. (temperatures of from 10° C. to 20° C. being preferred) under autogenous pressures (from atmospheric pressure up to about ten atmospheres). The novel haloalkyl propynyl ethers (or alkyl-substituted propynyl ethers) may be further halogenated to replace the acetylenic hydrogen atom by reaction with a lower halogen (Cl, Br, I) in the presence of a base such as an alkali metal or alkaline earth metal hydroxide or carbonate. When an alkali metal hydroxide (such as LiOH, NaOH or KOH) or an alkaline earth metal hydroxide is employed, alkali metal and alkaline earth metal hypohalites (NaOCl, NaOBr, KOBr, KOCl and the corresponding lithium, calcium and magnesium hypohalites) of the formula MOX are formed. In the formula MOX, M represents the equivalent weight of a metal (alkali metal or alkaline earth metal) and X represents a lower halogen (Br, Cl, I). The compound MOX may be added directly to the haloalkyl propynyl ethers or may be prepared in situ.

It is believed that the reaction of aluminum (or aluminum alloys, notably alloys containing magnesium and/or manganese) and haloalkane proceeds by a free radical mechanism with the formation of coupled organic products and aluminum halides. It is known that aluminum halides such as aluminum trichlorides react with some fluoroethers with resulting cleavage of the ether bond. It is therefore unexpected that these ethers function also as inhibitors in a reaction which is believed to produce aluminum chloride.

However, the haloalkyl propynyl ethers (and the haloalkyl halopropynyl ethers prepared therefrom) are exceptionally good inhibiting agents for decreasing the destruction of aluminum by haloalkane solvents. This property is especially surprising since the ethers of this invention which are used as inhibitors contain a haloalkyl group and an acetylenic unsaturation, both of which would be expected to react with aluminum halides independently of the ether linkage. The various haloethers which are produced according to the process of the invention may be used alone or in combination. Amounts of haloethers of up to about 20 percent of the total weight of the inhibited haloalkane solvents may be employed. Amounts of haloethers of from about 2.5 percent up to 10 percent by weight of the inhibited haloalkane solvents are ordinarily sufficient to substantially slow down or totally prevent the reaction of aluminum or aluminum alloys with haloalkane solvents.

The haloalkane solvents which are stabilized by incorporation of an inhibiting amount of the halo alkyl propynyl ethers, haloalkyl halopropynyl ethers or mixtures thereof include the mono- and polyhalogenated alkanes which are liquids or vapors at any temperature below about 200° C. at atmospheric pressure.

Haloalkanes which may be inhibited with the haloalkyl propynyl ethers and haloalkyl halopropynyl ethers include the mono- and polyhalogenated lower alkanes. For example, chloroform, iodoform, bromoform, methylchloroform, ethylchloroform, methylene chloride, carbon tetrachloride, polyhalo loweralkanes (such as a mixture of carbon tetrachloride, ethylene dichloride and ethylene dibromide), 1,1-dichloro-1,2-dibromoethane, 1,1,2-trichloro-1,2-dibromoethane, 1,2-dibromo-3-chloropropane, 1,1,1-trichloro-3-bromopropane, 1-chloro-2-bromoethane, 1,1-dichloroethane, 1,1,1-trichloroethane, 1,2-dichloropropane and 1,1,1-trichloro-3-bromopropane. While the minimum amount of haloalkyl propynyl ether (or haloalkyl halopropynyl ether) compound required to prevent the reaction of the haloalkane with aluminum may vary with the particular haloalkane involved, the addition of the haloalkyl ethers to any haloalkane which reacts with aluminum inhibits the attack of the aluminum by the haloalkane. Commercially available haloalkanes which generally contain from 1 to 6 carbon atoms and from 1 to 10 halogen atoms (especially Cl, Br and I) form a preferred class of solvents susceptible to treatment with the inhibitors of the present invention.

The following examples are submitted for the purpose of illustration only and are not to be construed as limiting the scope of the invention in any way.

*Example I*

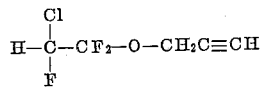

Into a cold (Dry Ice temperature) two liter capacity pressure bomb was charged 500 milliliters of propargyl alcohol (485 grams), 150 milliliters of Dowex Resin 21K (hydroxyl form) and 105 grams (0.9 mole) of chlorotrifluoroethylene. Dowex Resin 21K is a quaternary ammonium salt with a polymeric benzyl and three methyl groups on the nitrogen atom:

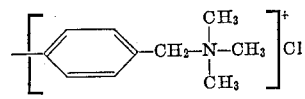

The reaction vessel was allowed to warm up to 14° C. at which temperature the olefin exerted a pressure of 50 p.s.i.g. The addition reaction was allowed to proceed at this temperature for eighteen hours. At the end of this time, the pressure in the reaction vessel was zero. The product solution was treated with water to give an insoluble organic layer which was separated. The aqueous layer was extracted with carbon tetrachloride and the extract combined with the organic layer. The solvent was removed by distillation and the reaction product distilled under reduced pressure to give 59 grams of 2-chloro-1,1,2-trifluoroethyl propynyl ether with the following properties:

$n_D^{25} = 1.3780$ $$\text{Sp. gr. } \frac{25°}{25} = 1.3290$$

Boiling point = 39° C. at 33 mm. Hg.

*Example II*

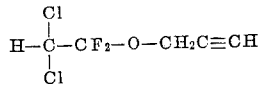

To a three-liter flask was added 174 grams (3 moles) of propargyl alcohol, 150 milliliters of a quaternary ammonium salt strong base ion exchanger (Dowex Resin 21K in hydroxyl form) and 1000 milliliters of carbon tetrachloride solvent. To this mixture was added 1.3 moles (174 grams) of 1,1-dichloro-2,2-difluoroethylene over a period of 1.5 hours at 17°–23° C. The reaction continued for a period of two hours and the temperature rose to 36° C. The reaction mixture was agitated for 15 hours at about 25° C. The resin catalyst was removed from the reaction mixture by filtration and the solvent was removed by distillation. The reaction product was then distilled under reduced pressure to give 2,2-dichloro-1,1-difluoroethyl propynyl ether in 71.8 percent yield.

$n_D^{25} = 1.4183$

Sp. gr. $\frac{25°}{25} = 1.3784$

Boiling point $= 59°$ C. at 24.5 mm. Hg

Example III

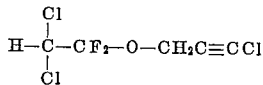

To a one-liter flask containing 120.8 grams (2.16 moles) of KOH in 500 milliliters of water was added 37.6 grams (0.53 mole) of chlorine. The chlorine addition was carried out over a period of 1.25 hours at 5° C. To the resulting mixture was added with stirring 100 grams (0.53 mole) of 2,2-dichloro-1,1-difluoroethyl propynyl ether (prepared as in Example II) over a period of three hours at a temperature of about 4° to 6° C. The temperature was increased to 25° C. for a two-hour period (resulting in approximately a 75 percent conversion of the starting ether). An additional amount of potassium hydroxide (40 grams) and chlorine (16 grams) was added and the reaction was continued for 12 hours at 50° C. The organic layer was then separated and, upon cooling to room temperature, the aqueous layer was extratced with ether. The solvent from the combined organic layer was removed by distillation and the reaction product distilled under reduced pressure to give 2,2-dichloro-1,1-difluoroethyl 3-chloropropynyl ether in 72.8 percent yield.

$n_D^{25} = 1.4446$

Sp. gr. $\frac{25°}{25} = 1.4995$

Boiling point $= 65°$ C. at 10 mm. Hg

Example IV

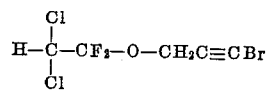

To a one-liter flask containing 60.4 grams (1.08 moles) of KOH in 300 milliliters of water was added 43.2 grams (0.27 mole) of bromine over a period of thirty minutes while maintaining the temperature at about 5° C. The 2,2-dichloro-1,1-difluoroethyl propynyl ether (50 grams; 0.265 mole) was added to this mixture with stirring over a period of 45 minutes at 5°–8° C. The reaction mixture was held at this temperature with stirring for a period of 3.5 hours and then the organic layer was separated. The aqueous layer was extracted with ether and the extract added to the organic portion. The extracting solvent was removed by distillation and the reaction product distilled under reduced pressure to give 2,2-dichloro-1,1-difluoroethyl 3-bromopropynyl ether in 70 percent yield.

$n_D^{25} = 1.4700$

Sp. gr. $\frac{25°}{25} = 1.7610$

Boiling point $= 76.5°$ C. at 7 mm. Hg

The corresponding 2-chloro-1,1,2-trifluoroethyl 3-chloropropynyl ether and 2-chloro-1,1,2-trifluoroethyl 3-bromopropynyl ether are prepared by reaction of 2-chloro-1,1,2-trifluoroethyl propynyl ether (prepared in Example I) with alkaline chlorine and bromine, respectively.

Example V

A piece of commercially available aluminum foil for kitchen use (approximate thickness 1/1000 inch) was scratched while immersed in methyl chloroform which had been treated with various amounts of the indicated compounds, as shown in Table 1.

TABLE 1.—METHYLCHLOROFORM STABILIZED WITH HALOALKYL PROPYNYL ETHER

| | Inhibitor (Haloalkyl Propynyl Ether) | Inhibitor Concentration (Percent by Volume of Haloalkyl Propynyl Ether) | Effect of Inhibitor on Al–CH₃CCl₃ Reaction |
|---|---|---|---|
| 1 | $H-\underset{Cl}{\overset{Cl}{C}}-CF_2-O-CH_2C\equiv CH$ | 9.08 | No reaction. |
| 2 | $H-\underset{Cl}{\overset{Cl}{C}}-CF_2-O-CH_2C\equiv CH$ | 4.76 | Slow reaction. |
| 3 | $H-\underset{Cl}{\overset{Cl}{C}}-CF_2-O-CH_2C\equiv CH$ | 1.95 | Very little inhibition. |
| 4 | $H-\underset{F}{\overset{Cl}{C}}-CF_2-O-CH_2C\equiv CH$ | 9.08 | No reaction. |
| 5 | $H-\underset{F}{\overset{Cl}{C}}-CF_2-O-CH_2C\equiv CH$ | 4.76 | Slow reaction. |
| 6 | $H-\underset{F}{\overset{Cl}{C}}-CF_2-O-CH_2C\equiv CH$ | 1.95 | Very little inhibition. |
| 7 | No inhibitor (CH₃CCl₃ alone) | 0 | Vigorous reaction. |

Methyl chloroform was employed as a solvent because of its high rate of decomposition by aluminum when compared with other halogenated solvents.

Example VI

Pieces of aluminum foil of the same type used in the tests of Example V were scratched while immersed in methyl chloroform which had been mixed with various amounts of haloalkyl halopropynyl ethers, as indicated in Table 2.

TABLE 2.—METHYL CHLOROFORM STABILIZED WITH HALOALKYL HALOPROPYNYL ETHERS

| | Inhibitor (Haloalkyl Halopropynyl Ether) | Inhibitor Concentration (Percent by Volume of Haloalkyl Halopropynyl Ether Incorporated Into Solvent) | Effect of Inhibitor on Al—$CH_3CCl_3$ Reaction |
|---|---|---|---|
| 1 | $H-\underset{Cl}{\overset{Cl}{C}}-CF_2-O-CH_2C\equiv CBr$ | 9.08 | No reaction. |
| 2 | $H-\underset{Cl}{\overset{Cl}{C}}-CF_2-O-CH_2C\equiv CBr$ | 4.76 | Slow reaction. |
| 3 | $H-\underset{Cl}{\overset{Cl}{C}}-CF_2-O-CH_2C\equiv CBr$ | 1.95 | Very little inhibition. |
| 4 | $H-\underset{Cl}{\overset{Cl}{C}}-CF_2-O-CH_2C\equiv CCl$ | 9.08 | No reaction. |
| 5 | $H-\underset{Cl}{\overset{Cl}{C}}-CF_2-O-CH_2C\equiv CCl$ | 4.76 | Slow reaction. |
| 6 | $H-\underset{Cl}{\overset{Cl}{C}}-CF_2-O-CH_2C\equiv CCl$ | 1.95 | Very little inhibition. |
| 7 | No inhibitor ($CH_3CCl_3$ alone) | 0 | Vigorous reaction. |

We claim as our invention:

1. Compounds of the formula

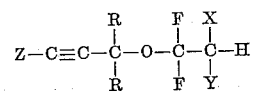

wherein:
(a) each R is independently selected from the group consisting of hydrogen and a monovalent saturated hydrocarbon group of from 1 to 6 carbon atoms,
(b) X and Y are each selected from the group consisting of the halogens (wherein both X and Y are fluorine atoms only when Z is a lower halogen), an alkyl group of from 1 to 6 carbon atoms and a perfluoroalkyl group of from 1 to 4 carbon atoms, and
(c) Z represents a member of the group consisting of the hydrogen atom and a halogen atom.

2. Compounds according to claim 1 wherein Z represents a middle halogen atom.

3. Compounds of the formula

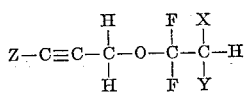

wherein X, Y and Z are middle halogens.

4. Compounds of the formula

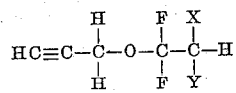

wherein X and Y are middle halogens.

5. The compound: 2-chloro-1,1,2-trifluoroethyl propynyl ether.
6. The compound: 2,2-dichloro-1,1-difluoroethyl propynyl ether.
7. The compound: 2-chloro-1,1,2-trifluoroethyl 3-chloropropynyl ether.
8. The compound: 2-chloro-1,1,2-trifluoroethyl 3-bromopropynyl ether.
9. The compound: 2,2-dichloro-1,1-difluoroethyl 3-chloropropynyl ether.
10. The compound: 2,2-dichloro-1,1-difluoroethyl 3-bromopropynyl ether.

References Cited
UNITED STATES PATENTS

| | | | |
|---|---|---|---|
| 1,841,768 | 1/1932 | Straus et al. | 260—631 |
| 2,409,274 | 10/1946 | Hanford et al. | 260—614 |
| 2,719,181 | 9/1955 | Cole | 260—652.5 |
| 2,872,487 | 2/1959 | Croix | 260—614 |
| 3,030,311 | 4/1962 | Oakes. | |
| 3,077,501 | 2/1963 | Oakes | 260—614 |
| 3,118,955 | 1/1964 | Young | 260—652.5 |
| 3,124,620 | 3/1964 | Davidowich et al. | 260—652.5 |
| 3,128,315 | 4/1964 | Hardies | 260—652.5 |

LEON ZITVER, *Primary Examiner.*

BERNARD HELFIN, *Examiner.*

H. T. MARS, *Assistant Examiner.*

UNITED STATES PATENT OFFICE
CERTIFICATE OF CORRECTION

Patent No. 3,359,329                        December 19, 1967

Charles T. Pumpelly et al.

It is hereby certified that error appears in the above numbered patent requiring correction and that the said Letters Patent should read as corrected below.

Column 2, lines 51 to 54, the formula should appear as shown below instead of as in the patent:

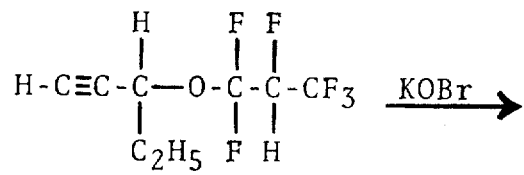

same column 2, lines 65 to 68, the formula should appear as shown below instead of as in the patent:

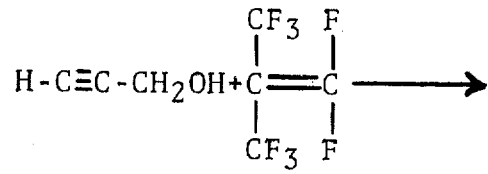

Signed and sealed this 11th day of February 1969.

(SEAL)
Attest:

EDWARD M. FLETCHER, JR.                   EDWARD J. BRENNER
Attesting Officer                         Commissioner of Patents